Nov. 11, 1947.  E. SNELL  2,430,537
RECIPROCATING LOAD CARRIER
Filed Dec. 8, 1944  4 Sheets-Sheet 1
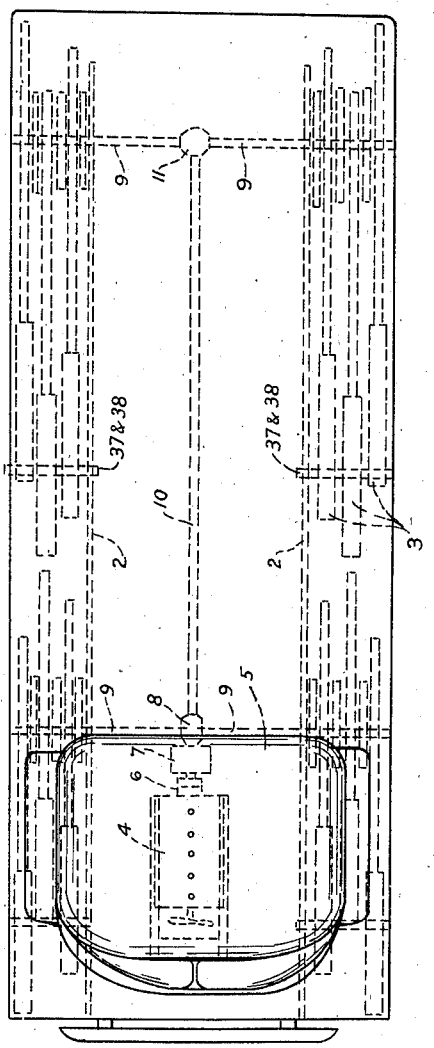
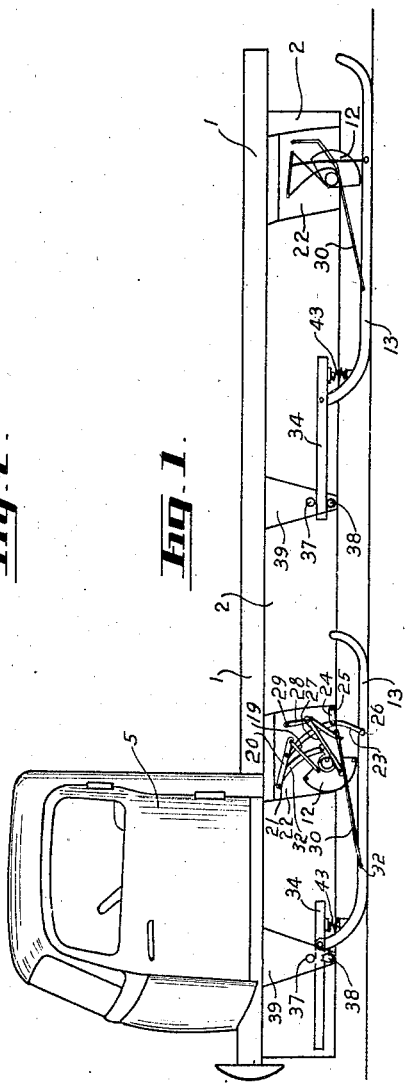
Edward Snell, Inv.

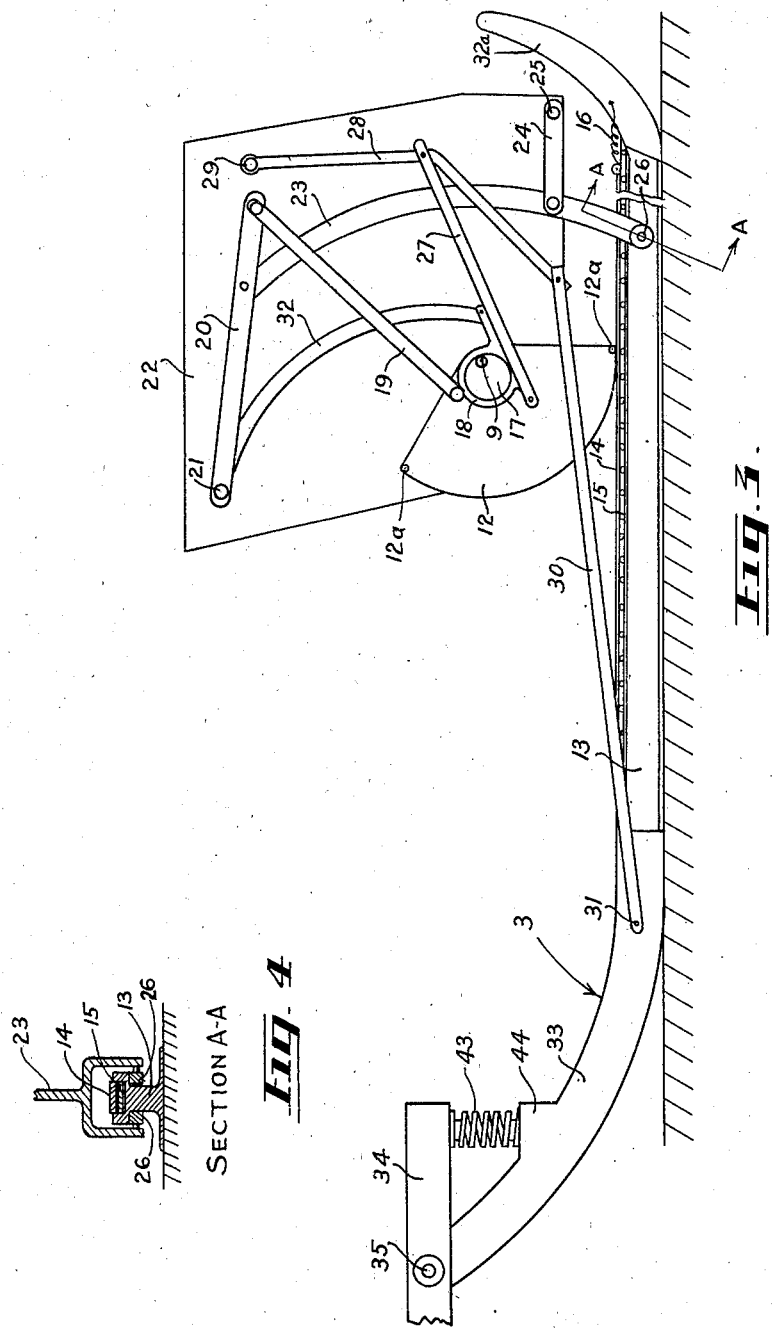

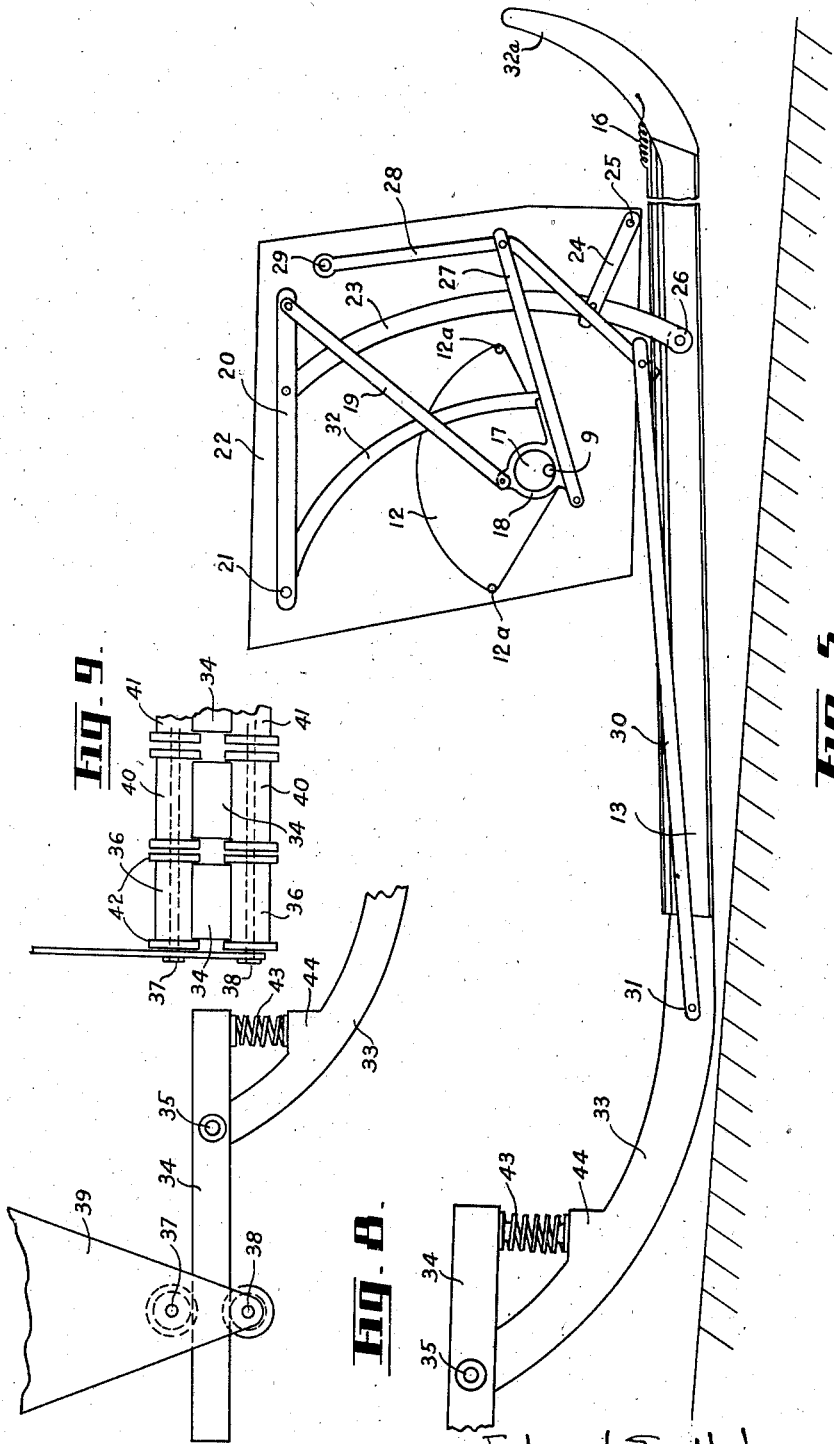

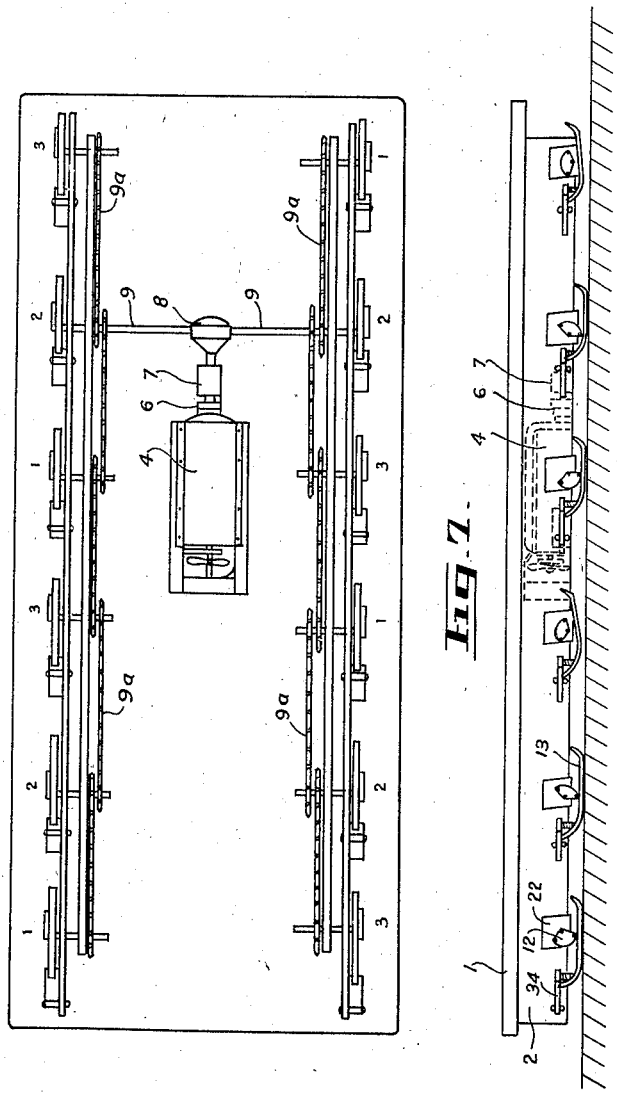

Patented Nov. 11, 1947

2,430,537

UNITED STATES PATENT OFFICE 2,430,537

RECIPROCATING LOAD CARRIER

Edward Snell, Westerose, Alberta, Canada

Application December 8, 1944, Serial No. 567,217

4 Claims. (Cl. 180—9)

This invention relates to a movable supporting device especially adapted for carrying and moving heavy loads on sandy ground or any soft lands from one position to another in such a manner that the load with the carrier may progress smoothly and uniformly by a system of stepping or walking not known in moving machines of this character, we find a mechanism such as tank tracks which carries the load smoothly and steadily over sandy or soft ground.

My invention has for its primary object a simple mechanism which takes the place of the conventional truck or tractor and consists of reciprocating tracks which appear to be so many separate feet.

Other objects and purposes together with novel and useful construction for attaining the same will appear as understanding of the invention is had, reference being made to the accompanying drawings in which:

Fig. 1 is an elevational view of the carrier showing the track units underneath each end of a platform also a cabin for the driver.

Fig. 2 is a plan view thereof showing the disposition of the track units and the power drive.

Fig. 3 is an elevational view of a unit showing the working mechanism.

Fig. 4 is a cross section of the track at A—A' of Fig. 3.

Fig. 5 is another view similar to Fig. 3, illustrating the stepping position of the parts during their operation.

Fig. 6 is a modified form in the arrangement of the track units on a carrier.

Fig. 7 is a bottom view thereof.

Fig. 8 is an elevational view completing the broken view of Fig. 5, and

Fig. 9 is an end view of the member shown in Fig. 8.

Like reference characters refer to like parts throughout the several views of the drawings.

The carrier here shown comprises a platform 1, which is supported by a main frame 2, on which are mounted the track units 3. Three of these units are mounted at each of the four corners of the vehicle and they are so timed together that there is always one unit at each corner which contacts with the ground. The power plant and the operating mechanism for the carrier are of the standard type now commonly in use, the power plant located underneath the driver's cabin 5, consists of an engine 4, transmitting the power through a clutch 6, a gear box 7, and a differential gear 8. The power is then distributed to four axle shafts 9, the two front axle shafts 9, are driven direct from the front differential gear 8, the rear axle shafts 9, are driven through a further differential 11, by a drive shaft 10, as will be seen in Fig. 2, of the drawings.

An alternative arrangement of the tracks 13, may be resorted to if found necessary to do so as seen in Figs. 6 and 7, of the drawings, this arrangement will accommodate a load on the carrier in an equally distributed manner, each track 13, being driven in turn by a drive chain 9A through a series of sprocket gears.

Mounted on the shaft 9, is a segmental wheel 12, which transmits the load of the carrier to a track 13, by rolling on it. The track resting on the ground, remains stable while the segmental wheel proceeds rolling on it, taking the carrier forward. At the end of the arc of the segmental wheel, another segmental wheel adjacent to it and working on another track is timed to begin to roll and bring the vehicle further ahead and at the end of its way a third segmental wheel also adjacent to the two others proceeds for the last and third portion of the complete revolution of the mainshaft 9. Each segmental wheel has an arc to insure no interference with the raising of the track.

At the point of contact 12, there is a roller 12A where the segmental wheel 12 rolls on an I-shaped track 13, there is a steel bar 14, imbedded in the track and supported with small rollers 15, underneath, and held in place by an end spring 16, at one end, making the contact surface free from the track member 13, and working as a stabilizer when the cycle begins.

Attached to the main axle 9, is also an eccentric disc 17, which operates a bushing 18, in its turn operating an arm 19, which connects a lever 20, fulcrumed at the other end at 21, on a structural plate 22 located beneath the platform 1. The lever 20, is connected with a further arm 23, which lifts the track 13. A short arm 24, fulcrumed at its end 25, on the plate 22, holds the lifting arm 23, in place. The end of the lifting arm 23, is of curved shape and carries two rollers 26, which bear under the top side of the I-track 13. The eccentric 17, is so timed that it will operate the lifting arm 23, which in turn will start lifting the track 13, and permit it to move frontward for another cycle. The rollers 26, are small enough in diameter to remain free for operation on the inside space of the I-track 13, when the lifting arm 23, is operated downward by the eccentric 17.

Another arm 27, is fastened at one end to the bushing 18, and operates a lever 28, fulcrumed at one end 29, to the structural plate 22. This lever 28, operates at its opposite end on a further arm 30, connected to the track 13, as at 31. A curved working lever 32, pivoted at 21, on the plate 22, holds the bushing 18, from revolving completely around. All arms serve to push ahead on the track member 13, when the supporting arm 23, starts lifting it, and sets the track in position for the following cycle.

Both ends of the track 13, are turned upwardly as shown at 32a for the back end and as at 33, for the front end, permitting the whole device to run over irregularities of the ground. The front end of the track carries sliding mechanism which supports the track when it is shoved forward. The front end 33, of the track 13, is connected to a sliding bar 34, by a pin 35. The bar 34, slides between two rollers 36, which are revolving freely on two separate shafts 37, and 38, located one above the other and supported by the main frame 2, and attached thereto by a bracket 39, located underneath the platform 1. Shafts 37 and 38, carry the other two sets of rollers 40—41, as required for the sliding bars of the other two units. Each roller has two flanges 42, similar to a spool to guide the sliding bar 34, in its course. A heavy spring 43, is mounted on a boss 44, of the front end of the track 13, working against the end of the sliding bar 34. While pivoted by the pin 35, on the sliding bar 34, the track 13, is therefore, resiliently assembled to permit an easy and smooth movement.

In operation the plurality of track units 3 are operated by the shafts 9 which rotate the segment wheels 12 to bring the segment wheel into contact with the bar 14 mounted on top of the track 13. Friction between the segment wheel and bar is eliminated by rollers 12A. The bar 14 is mounted on rollers 15 to permit slight longitudinal movement of the bar 14 in either direction and spring 16 holds bar 14 near the center of travel of the segment wheel. An eccentric disk 17 carried by shaft 9 rotates in unison with the segment wheel 12 and actuates the lifting arm 23 and pushing arm 30, so that when the segment which is out of contact with the track the latter is lifted by the arm 23 and pushed forward by the arm 30, thus setting the track in a forward position. With the track set in a forward position, the segment wheel upon completion of its cycle will move the body of the carrier forward. The operation of the tracks is timed so one track of each unit contacts the ground at the same time and the carrier is moved progressively forward as the operating mechanism of each track completes its cycle.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

1. A propelling mechanism for a carrier comprising track units including a plurality of tracks, drive shafts, segmental wheels carried by said drive shafts adapted to intermittently contact said tracks upon rotation of said drive shafts to move said carrier forward, eccentrics carried by said drive shafts, lifting arms connected to said tracks, levers connecting said eccentrics with said lifting arms operable to raise said tracks upon rotation of the eccentrics, push bars connected to said tracks, and levers connecting said push bars with said eccentrics operable to move said tracks forwardly when the tracks are raised, the forward operation of the tracks being timed sequentially relative to each other.

2. A propelling mechanism of the character described in claim 1 including longitudinal movable track bars on the upper surface of said tracks for contact with said segmental wheels.

3. A propelling mechanism of the character described comprising track units including a plurality of tracks pivotally and slidably connected at one end to the body of a carrier, rotatable segmental wheels carried by the carrier having intermittent rolling contact with the top of said tracks, lifting arms between said carrier and tracks, pushing bars between said carrier and tracks, and eccentric means for operating said lifting arms and pushing bars to raise and move said tracks in a forward direction, the forward operation of said tracks being timed sequentially in relation to each other.

4. A propelling mechanism for carriers comprising track units including a plurality of tracks pivotally and slidably connected at one end to the carrier, rotatable segmental wheels carried by the carrier, longitudinally slidable contact bars on the upper surface of said tracks for rolling contact with said segmental wheels, means limiting the movement of said contact bars, lifting arms connected with said tracks, pushing bars connected with said tracks, and eccentric means for operating said lifting arms and pushing bars to raise and move said tracks in a forward direction, the forward operation of said tracks being timed sequentially in relation to each other.

EDWARD SNELL.

REFERENCES CITED

The following references are of record in the file of this patent:

UNITED STATES PATENTS

| Number | Name | Date |
|---|---|---|
| 1,298,953 | Jenson | Apr. 1, 1919 |
| 1,086,466 | Rood et al. | Feb. 10, 1914 |
| 1,421,387 | Bentson | July 4, 1922 |
| 1,479,249 | O'Leary | Jan. 1, 1924 |

FOREIGN PATENTS

| Number | Country | Date |
|---|---|---|
| 9,240 | Great Britain | Dec. 9, 1915 |
| 415,067 | Germany | June 13, 1925 |